United States Patent
Tu et al.

(10) Patent No.: US 12,430,846 B2
(45) Date of Patent: Sep. 30, 2025

(54) COMPUTING APPARATUS AND MODEL GENERATION METHOD

(71) Applicants: Yu-Wei Tu, New Taipei (TW); HOMEE AI Technology Inc., Taipei (TW)

(72) Inventors: Yu-Wei Tu, New Taipei (TW); Chun-Kai Chang, New Taipei (TW)

(73) Assignees: Yu-Wei Tu, New Taipei (TW); HOMEE AI Technology Inc., Taipei (TW)

( * ) Notice: Subject to any disclaimer, the term of this patent is extended or adjusted under 35 U.S.C. 154(b) by 226 days.

(21) Appl. No.: 18/353,852

(22) Filed: Jul. 17, 2023

(65) Prior Publication Data

US 2024/0029350 A1 Jan. 25, 2024

Related U.S. Application Data

(60) Provisional application No. 63/391,333, filed on Jul. 22, 2022.

(30) Foreign Application Priority Data

Oct. 27, 2022 (TW) .................................. 111140954

(51) Int. Cl.
*G06T 17/00* (2006.01)
*G06Q 30/0601* (2023.01)
(Continued)

(52) U.S. Cl.
CPC .......... *G06T 17/00* (2013.01); *G06Q 30/0623* (2013.01); *G06T 7/11* (2017.01);
(Continued)

(58) Field of Classification Search
CPC . G06T 17/00; G06T 7/11; G06T 2207/10028; G06T 2207/20221;
(Continued)

(56) References Cited

U.S. PATENT DOCUMENTS

| 2019/0371024 A1* | 12/2019 | Wisely Babu ......... G06V 10/82 |
| 2022/0137223 A1 | 5/2022 | Brenner et al. |
| 2022/0392151 A1* | 12/2022 | Blodow ............... G06T 19/006 |

FOREIGN PATENT DOCUMENTS

| CN | 109556611 | 4/2019 |
| CN | 114608554 | 6/2022 |

(Continued)

OTHER PUBLICATIONS

"Office Action of Taiwan Counterpart Application", issued on Jul. 31, 2023, p. 1-p. 9.

*Primary Examiner* — Hau H Nguyen
(74) *Attorney, Agent, or Firm* — JCIPRNET

(57) ABSTRACT

A computing apparatus and a model generation method are provided. In the method, multiple sensing data are fused to determine depth information of multiple sensing points, moving trajectories of one or more pixels in the image data are tracked according to the image data and the inertial measurement data through the visual inertial odometry (VIO) algorithm, and those sensing points are mapped into a coordinate system according to the depth information and the moving trajectories through the simultaneous localization and mapping (SLAM) algorithm, to generate a three-dimensional environment model. An object is set on the three-dimensional environment model through a setting operation. The shopping information of the object is provided.

10 Claims, 2 Drawing Sheets

(51) Int. Cl.
 *G06T 7/11* (2017.01)
 *G06T 7/20* (2017.01)
 *G06T 7/50* (2017.01)
 *G06T 7/73* (2017.01)

(52) U.S. Cl.
 CPC .................. *G06T 7/20* (2013.01); *G06T 7/50* (2017.01); *G06T 7/75* (2017.01); *G06T 2207/20021* (2013.01); *G06T 2207/30241* (2013.01)

(58) Field of Classification Search
 CPC ....... G06T 2200/04; G06T 2207/30241; G06T 7/20; G06T 7/55; G06T 7/70; G06T 7/75; G06T 2207/20021
 See application file for complete search history.

(56) References Cited

FOREIGN PATENT DOCUMENTS

| | | |
|---|---|---|
| TW | I768776 | 6/2022 |
| TW | M637241 | 2/2023 |

\* cited by examiner

COMPUTING APPARATUS AND MODEL GENERATION METHOD

CROSS-REFERENCE TO RELATED APPLICATION

This application claims the priority benefit of U.S. provisional application Ser. No. 63/391,333, filed on Jul. 22, 2022 and Taiwan application serial no. 111140954 filed on Oct. 27, 2022. The entirety of each of the above-mentioned patent applications is hereby incorporated by reference herein and made a part of this specification.

BACKGROUND

Technical Field

The disclosure relates to a spatial modeling technology, and in particular relates to a computing apparatus and a model generation method.

Description of Related Art

In order to simulate a real environment, the space of the real environment may be scanned to generate a simulated environment that looks like the real environment. The simulated environment may be implemented in applications such as games, home furnishing, robot movement, etc. It is worth noting that the sensing data obtained by scanning the space may have errors, which cause distortion of the simulated environment.

SUMMARY

A computing apparatus and a model generation method that may compensate errors, thereby improving the fidelity of the simulated environment, are provided.

The model generation method of the embodiment of the disclosure includes the following operation. Multiple sensing data are fused to determine depth information of multiple sensing points. The sensing data include image data and inertial measurement data. Moving trajectories of one or more pixels in the image data are tracked according to the image data and the inertial measurement data through a visual inertial odometry (VIO) algorithm. The sensing points are mapped into a coordinate system according to the depth information and the moving trajectories through a simultaneous localization and mapping (SLAM) algorithm, to generate a three-dimensional environment model. A position in a three-dimensional environment model is defined by the coordinate system.

A computing apparatus of the embodiment of the disclosure includes a memory and a processor. The memory is configured to store program code. The processor is coupled to the memory. The processor loads the program code to execute the following operation. The computing apparatus is configured to fuse multiple sensing data to determine depth information of multiple sensing points. Moving trajectories of one or more pixels in the image data are tracked according to the image data and the inertial measurement data through a visual inertial odometry algorithm. The sensing points are mapped into a coordinate system according to the depth information and the moving trajectories through a simultaneous localization and mapping algorithm, to generate a three-dimensional environment model. The sensing data include image data and inertial measurement data. A position in a three-dimensional environment model is defined by the coordinate system.

Based on the above, according to the computing apparatus and the model generation method of the disclosure, VIO and SLAM algorithms are used to estimate the positions of sensing points in the environment, and a three-dimensional environment model is established accordingly. In this way, the accuracy of position estimation and the fidelity of the three-dimensional model may be improved.

In order to make the above-mentioned features and advantages of the disclosure comprehensible, embodiments accompanied with drawings are described in detail below.

DETAILED DESCRIPTION OF DISCLOSED EMBODIMENTS

Figure 1:
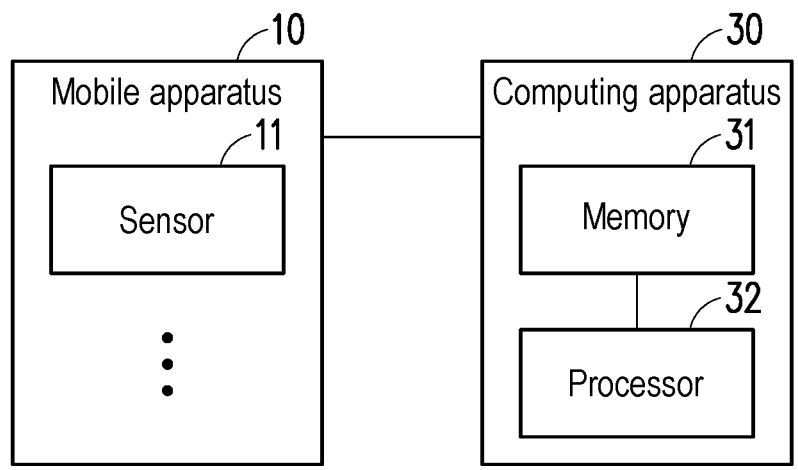
FIG. 1 is a schematic diagram of a model generation system according to an embodiment of the disclosure.

FIG. 1 is a schematic diagram of a model generation system 1 according to an embodiment of the disclosure. Referring to FIG. 1, the model generation system 1 includes (but not limited to) a mobile apparatus 10 and a computing apparatus 30.

The mobile apparatus 10 may be a mobile phone, a tablet, a scanner, a robot, a wearable device, a self-propelled vehicle, or a vehicle-mounted system. The mobile apparatus 10 includes (but not limited to) multiple sensors 11.

The sensor 11 may be an image capture device, LiDAR, a time-of-flight (ToF) detector, an inertial measurement unit (IMU), an accelerometer, a gyroscope, or an electronic compass. In one embodiment, the sensor 11 is configured to obtain sensing data. The sensing data include image data and inertial sensing data. The image data may be one or more images and the sensing intensities of the pixels thereof. The inertial sensing data may be attitude, three-axis acceleration, angular velocity, or displacement.

The computing apparatus 30 may be a mobile phone, a tablet, a desktop computer, a laptop, a server, or a smart assistant apparatus. The computing apparatus 30 is communicatively connected to the mobile apparatus 10. For example, data is sent or received through Wi-Fi, Bluetooth, infrared or other wireless transmission technologies, or through internal circuits, Ethernet, fiber optic networks, universal serial bus (USB) or other wired transmission technologies, and may be realized by an additional communication transceiver (not shown). The computing apparatus 30 includes (but not limited to) a memory 31 and a processor 32.

The memory 31 may be any type of fixed or movable random access memory (RAM), read only memory (ROM), flash memory, conventional hard disk drive (HDD), solid-state drive (SSD) or similar components. In one embodiment, the memory 31 is configured to store program codes, software modules, data (e.g., sensing data, or three-dimensional models) or files, and details thereof are described in detail in subsequent embodiments.

The processor 32 is coupled to the memory 31. The processor 32 may be a central processing unit (CPU), or other programmable general-purpose or special-purpose microprocessors, a digital signal processor (DSP), a programmable controller, an application-specific integrated circuit (ASIC), or other similar components, or a combination of components thereof. In one embodiment, the processor 32 is used to execute all or some of the operations of the computing system 30, and may load and execute program codes, software modules, files, and/or data stored in the memory 31. In one embodiment, the processor 32 performs all or a portion of the operations of the embodiments of the disclosure. In some embodiments, the software modules or program codes recorded in the memory 31 may also be realized by physical circuits.

In some embodiments, the mobile apparatus 10 and the computing apparatus 30 may be integrated into an independent apparatus.

Hereinafter, the method according to the embodiment of the disclosure is described in conjunction with various devices and elements in the model generation system 1. Each process of the method may be adjusted according to the implementation, and is not limited to thereto.

Figure 2:
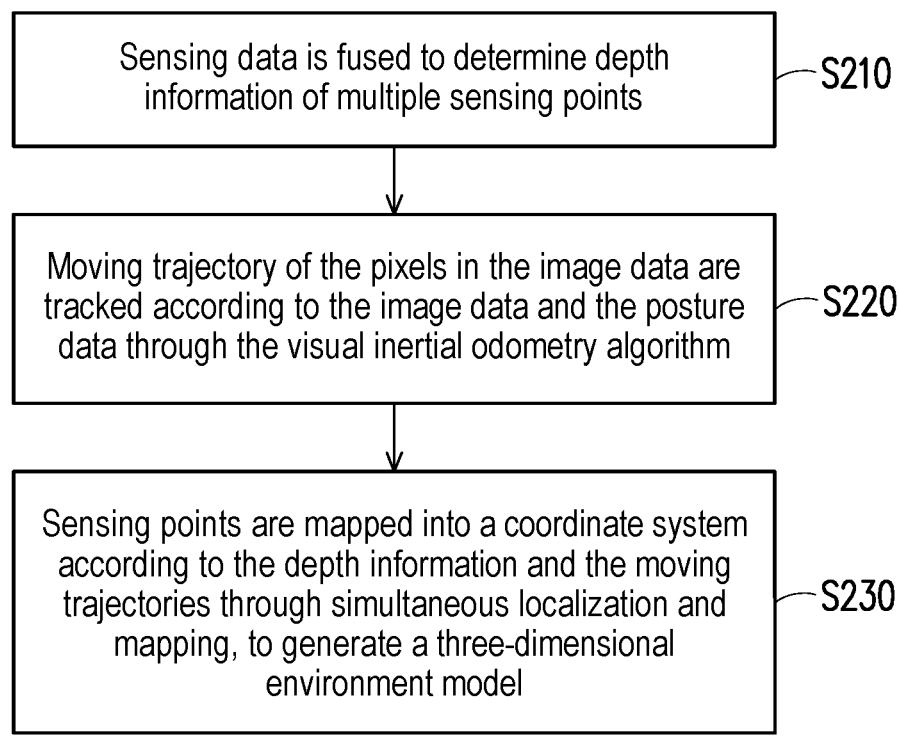
FIG. 2 is a flowchart of a method for generating a model according to an embodiment of the disclosure.

FIG. 2 is a flowchart of a model generation method according to an embodiment of the disclosure. Referring to FIG. 2, the processor 32 of the computing apparatus 30 fuses multiple sensing data to determine depth information of multiple sensing points (step S210). Specifically, multiple sensing points may be formed by scanning the surrounding environment through the sensor 11. The depth information of the sensing point may be the distance between the sensor 11 and the sensing point. In one embodiment, the processor 32 may match images in the image data into multiple image blocks. For example, the processor 32 may identify objects (e.g., walls, ceilings, floors or cabinets) in the images through image feature comparison or deep learning models, and divide them into image blocks according to the outline of the region where the objects are located. Next, the processor 32 may determine the depth information corresponding to those image blocks. For example, the processor 32 may extract features through a deep learning model and predict the depth information of the image block or the corresponding object accordingly. The deep learning model/algorithm may analyze the training samples to obtain the pattern therein, so as to predict the unknown data through the pattern. Generally speaking, depth information is usually related to the size ratio and posture of objects in the scene. The deep learning model is a machine learning model constructed after learning, and inferences are made based on the data to be evaluated (e.g., the image region). For another example, the processor 32 may compare the feature information of objects in different positions stored in the image region and the memory 31. The processor 32 may determine the depth information based on the position whose similarity is higher than a corresponding threshold value.

In another embodiment, the sensor 11 is a depth sensor or a distance sensor. The processor 32 may determine the depth information of multiple sensing points in the environment according to the sensing data of the depth sensor or the distance sensor.

The processor 32 tracks the moving trajectories of one or more pixels in the image data according to the image data and the inertial measurement data through a visual inertial odometry (VIO) algorithm (step S220). Specifically, VIO is a technology that uses one or more image capture devices and one or more IMUs for state measurement. The aforementioned state refers to the posture (attitude), velocity or other physical quantities of the carrier of the sensor 11 (e.g., the mobile apparatus 10) in a certain degree of freedom. Since the image capture device may capture photons within a certain exposure time to obtain a two-dimensional (2D) image, the image data obtained by the image capture device records quite an abundance of environmental information when moving at a low speed. However, at the same time, the image data is easily affected by the environment and has the problem of ambiguity in size. In contrast, the IMU is used to sense its own angular acceleration and acceleration. Although the inertial measurement data is relatively single and has a large cumulative error, it is not affected by the environment. In addition, inertial measurement data also has the characteristics of exact scale units, which makes up for the shortcomings of the image data. By integrating image data and inertial measurement data, more accurate inertial navigation may be obtained.

Figure 3:
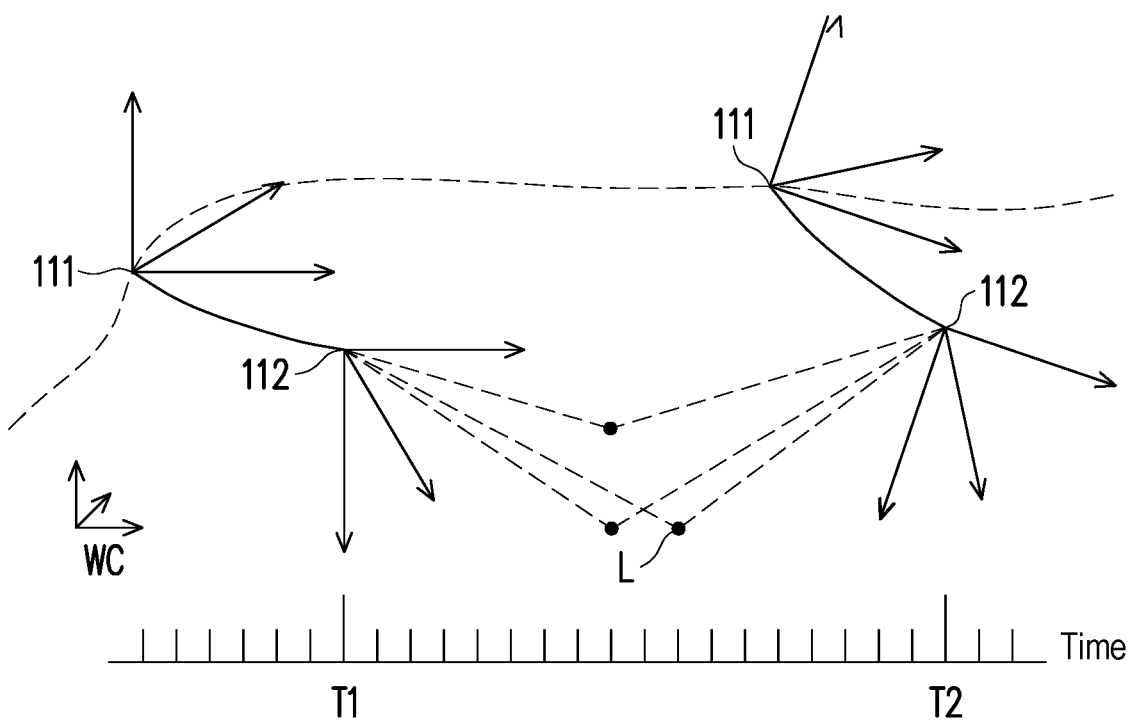
FIG. 3 is a schematic diagram of inertial navigation according to an embodiment of the disclosure.

FIG. 3 is a schematic diagram of inertial navigation according to an embodiment of the disclosure. Referring to FIG. 3, the processor 32 may determine the position difference of the object in the image data between the time point T1 and the time point T2. Time point T1 is earlier than time point T2. The object occupies a portion of the pixels in the image. The processor 32 may identify the object, determine the image position of the object in the image, and define the object as a landmark L. The processor 32 may compare the position difference of the same object captured by the image capture device 112 at two different time points T1 and T2.

Next, the processor 32 may determine the moving trajectory from the time point T1 to the time point T2 according to the initial position at the time point T1 and the position difference. The initial position is determined according to the inertial measurement data (obtained through the IMU 111) at the time point T1. For example, an inertial integration of the IMU 111 may yield the initial position. The processor 32 may further convert the position of the landmark L from the sensing coordinate system to the world coordinate system WC. There are many data fusion methods for VIO, for example, loosely coupled and tightly coupled. The loosely coupled algorithm respectively performs posture estimation according to the image data and the inertial measurement data, and then fuses the posture estimation results. The tightly coupled algorithm directly fuses image data and inertial measurement data, constructs motion and observation equations according to the fusion data, and performs state estimation accordingly.

Referring to FIG. 2, the processor 32 maps the sensing points into a coordinate system according to the depth information and the moving trajectories through a simultaneous localization and mapping (SLAM) algorithm, to generate a three-dimensional (3D) environment model (step S230). Specifically, the SLAM algorithm may convert the depth information of sensing points in the environment at different times and at different positions through coordinate conversion into the same coordinate system, thereby generating a complete three-dimensional environment model of the environment. A position in a three-dimensional environment model is defined by this coordinate system.

However, an unbiased/error-free and highly accurate three-dimensional environment model of the environment needs to rely on unbiased moving trajectories and depth information. However, various sensors 11 usually have different degrees of error. In addition, noise often exists in real environments, so SLAM algorithms should consider not only the mathematically unique solution, but also the interaction with the physical concepts related to the result. It is worth noting that in the next iterative computing step of three-dimensional model construction, the measured distance and orientation/posture have a predictable series of errors. These errors are usually caused by the limited accuracy of the sensor 11 and other noises from the environment, and reflect errors in points or features on the three-dimensional environment model. Errors in positioning and map construction accumulate over time and with changes in motion, which in turn affects the accuracy of the map itself.

In one embodiment, the processor 32 may match a first correlation at a first time point and a second correlation at a second time point. The first time point is earlier than the second time point. The first correlation is the correlation between those sensing data at the first time point and the corresponding positions in the three-dimensional environment model, and the second correlation is the correlation between those sensing data at the second time point and the corresponding positions in the three-dimensional environment model. That is, the sensing data at a specific time point and the corresponding landmarks. The SLAM algorithm structure solves the bias of various sensing data through a repeated operation of mathematical problem. The mathematical problem is, for example, forming a motion equation and an observation equation based on sensing data (as states).

The processor 32 may correct the positions of those sensing points on the coordinate system according to the matching result between the first correlation and the second correlation. To compensate for these errors, the processor 32 may match the current three-dimensional environment model with previous three-dimensional environment models, for example, through a loop closure algorithm that has gone through repeated locations in the three-dimensional environment model. Alternatively, algorithms related to SLAM probability are used, such as Kalman filtering, particle filtering (a type of Monte Carlo method), and scanning matched data ranges. Through these algorithms, the processor 32 may gradually optimize the past and present trajectory positions and depth information by comparing the sensing data of the current (e.g., the second time point) and the past (e.g., the first time point). Through recursive optimization, accurate estimation of each point in the environment may be obtained. It may be seen from the above description that the algorithm of the embodiment of the disclosure may form a closed loop, and may also accumulate a complete and accurate three-dimensional environment model as the trajectory progresses. Conversely, if a closed loop is not formed, errors may continue to accumulate and magnify, eventually leading to incoherent data, resulting in a useless three-dimensional environment model.

In one embodiment, the processor 32 may minimize the error of the positions of the sensing points on the coordinate system through an optimization algorithm according to the first correlation and the second correlation, and may estimate the positions of those sensing points on the coordinate system through a filtering algorithm according to the second correlation. The optimization algorithm converts the state estimation of SLAM into an error term and minimizes the error term. For example, the optimization algorithm may be the Newton method, the Gauss-Newton method, or the Levenberg-Marquardt method. Filtering algorithms are, for example, the Kalman filtering, the extended Kalman filtering, and particle filtering. The optimization algorithm may consider sensing data at different time points, while the filtering algorithm introduces noise to the current sensing data.

The difference from the prior art is that, compared with the prior art which only adopts the optimization algorithm or the filtering algorithm, the embodiment of the disclosure combines both algorithms. The proportion of the optimization algorithm and the filtering algorithm is related to the hardware and software resources of the computing apparatus 30 and the accuracy of the predicted position. For example, if the software and hardware resources or the accuracy requirement is low, the proportion of the filtering algorithm is higher than the proportion of the optimization algorithm. If the software and hardware resources or the accuracy requirement is high, the proportion of the optimization algorithm is higher than the proportion of the filtering algorithm.

In one embodiment, the processor 32 may receive a setting operation. The setting operation may be obtained through a touch panel, a mouse, a keyboard, or other input devices. For example, the setting operation may be obtained through a swiping, pressing, or tapping operation. The processor 32 may set an object in the three-dimensional environment model according to the setting operation. According to different application scenarios, the object is, for example, a furniture, a picture frame, or a home appliance. The processor 32 may move the object according to the setting operation, and place the object at a designated position in the three-dimensional environment model. Then, the processor 32 may provide shopping information of the object through a display (not shown). For example, options such as object name, price, shipping method, payment options, etc. The processor 32 may also be connected to the store server through a communication transceiver (not shown), and complete the shopping process accordingly.

In an application scenario, the mobile apparatus 10 may quickly scan the space and perceive all the size information in the space, so that the user may directly and easily arrange furniture in the three-dimensional environment model without any manual measurement. A software as a service (SaaS) system is also provided in the embodiment of the disclosure, allowing the user to refer to the actual space to display or adjust the placement, and the shopping program loaded on the computing apparatus 30 may add products to the shopping cart to shop directly. In addition, cloud connection enables users to assist each other in remote furnishing and spatial arrangement, thereby becoming the largest home furnishing online community. However, not limited to furniture arrangements, the rapid model building characteristic of the embodiment of the disclosure may also be imported into other applications.

To sum up, in the computing apparatus and model generation method of the disclosure, data fusion is performed on data from sensors such as LiDAR, camera, IMU, etc., of mobile phones or other portable mobile apparatuses to obtain depth information, and then VIO algorithm is used to track the moving trajectories of different pixels on the camera. Depth information and moving trajectory are then used to optimize in conjunction with the SLAM algorithm framework to obtain accurate estimation of each sensing point in the environment.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:
1. A model generation method, comprising:
fusing a plurality of sensing data to determine depth information of a plurality of sensing points, wherein the sensing data comprise image data and inertial measurement data, wherein fusing the sensing data comprises:

dividing the image data into a plurality of image blocks; and
determining depth information corresponding to the image blocks;
tracking a moving trajectory of at least one pixel in the image data according to the image data and the inertial measurement data through a visual inertial odometry (VIO) algorithm; and
mapping the sensing points into a coordinate system according to the depth information and the moving trajectory through a simultaneous localization and mapping (SLAM) algorithm, to generate a three-dimensional environment model, wherein a position in the three-dimensional environment model is defined by the coordinate system,
wherein mapping the sensing points into the coordinate system comprises adaptively correcting positions of the sensing points on the coordinate system by combining an optimization algorithm and a filtering algorithm that introduces noise to current sensing data, wherein a proportion of the optimization algorithm and the filtering algorithm is dynamically adjusted based on computational resources and accuracy requirements.

2. The model generation method according to claim 1, wherein adaptively correcting is performed based on a matching result between a first correlation at a first time point and a second correlation at a second time point,
wherein the first time point is earlier than the second time point, the first correlation is a correlation between the sensing data at the first time point and corresponding positions in the three-dimensional environment model, and the second correlation is a correlation between the sensing data at the second time point and corresponding positions in the three-dimensional environment model.

3. The model generation method according to claim 2, wherein correcting the positions of the sensing points on the coordinate system according to the matching result between the first correlation and the second correlation comprises:
minimizing error of the positions of the sensing points on the coordinate system through the optimization algorithm according to the first correlation and the second correlation; and
estimating the positions of the sensing points on the coordinate system through the filtering algorithm comprising at least one of a Kalman filter, an extended Kalman filter, and a particle filter according to the second correlation, wherein a proportion of the optimization algorithm and the filtering algorithm is related to resources of the computing apparatus and accuracy of a predicted position.

4. The model generation method according to claim 1, wherein tracking the moving trajectory of the at least one pixel in the image data comprises:
determining a position difference of an object in the image data between a third time point and a fourth time point, wherein the third time point is earlier than the fourth time point; and
determining moving trajectory from the third time point to the fourth time point according to an initial position at the third time point and the position difference, wherein the initial position is determined according to the inertial measurement data at the third time point.

5. The model generation method according to claim 1, further comprising:

receiving a setting operation;
setting an object in the three-dimensional environment model according to the setting operation; and
providing shopping information of the object.

6. A computing apparatus, comprising:
a memory, configured to store program code; and
a processor, coupled to the memory and configured to load the program code to execute:
fusing a plurality of sensing data to determine depth information of a plurality of sensing points, wherein the sensing data comprise image data and inertial measurement data,
wherein fusing the sensing data comprises:
dividing the image data into a plurality of image blocks; and
determining depth information corresponding to the image blocks;
tracking a moving trajectory of at least one pixel in the image data according to the image data and the inertial measurement data through a visual inertial odometry algorithm; and
mapping the sensing points into a coordinate system according to the depth information and the moving trajectory through a simultaneous localization and mapping algorithm, to generate a three-dimensional environment model, wherein a position in the three-dimensional environment model is defined by the coordinate system,
wherein mapping the sensing points into the coordinate system comprises adaptively correcting positions of the sensing points on the coordinate system by combining an optimization algorithm and a filtering algorithm that introduces noise to current sensing data, wherein a proportion of the optimization algorithm and the filtering algorithm is dynamically adjusted based on computational resources and accuracy requirements.

7. The computing apparatus according to claim 6, wherein adaptively correcting is performed based on a matching result between a first correlation at a first time point and a second correlation at a second time point,
wherein the first time point is earlier than the second time point, the first correlation is a correlation between the sensing data at the first time point and corresponding depth information and corresponding moving trajectory, and the second correlation is a correlation between the sensing data at the second time point and corresponding depth information and corresponding moving trajectory.

8. The computing apparatus according to claim 7, wherein the processor is further configured to execute:
minimizing error of the positions of the sensing points on the coordinate system through the optimization algorithm according to the first correlation and the second correlation; and
estimating the positions of the sensing points on the coordinate system through the filtering algorithm that introduces noise to the current sensing data comprising at least one of a Kalman filter, an extended Kalman filter, and a particle filter according to the second correlation, wherein a proportion of the optimization algorithm and the filtering algorithm is related to resources of the computing apparatus and accuracy of a predicted position.

9. The computing apparatus according to claim 6, wherein the processor is further configured to execute:

determining a position difference of an object in the image data between a third time point and a fourth time point, wherein the third time point is earlier than the fourth time point; and determining moving trajectory from the third time point to the fourth time point according to an initial position at the third time point and the position difference, wherein the initial position is determined according to the inertial measurement data at the third time point.

10. The computing apparatus according to claim 6, wherein the processor is further configured to execute:

receiving a setting operation;

setting an object in the three-dimensional environment model according to the setting operation; and providing shopping information of the object.

* * * * *